United States Patent [19]
Friedmann

[11] Patent Number: 5,046,991
[45] Date of Patent: Sep. 10, 1991

[54] CONTINUOUSLY VARIABLE SPEED TRANSMISSION

[75] Inventor: Oswald Friedmann, Lichtenau, Fed. Rep. of Germany

[73] Assignee: LuK Lamellen und Kupplungsbau GmbH, Bühl, Fed. Rep. of Germany

[21] Appl. No.: 616,356

[22] Filed: Nov. 21, 1990

[30] Foreign Application Priority Data

Nov. 21, 1989 [DE] Fed. Rep. of Germany ....... 3938593
Dec. 7, 1989 [DE] Fed. Rep. of Germany ....... 3940460

[51] Int. Cl.$^5$ ............................................. F16H 63/00
[52] U.S. Cl. ......................................... 474/18; 474/28
[58] Field of Search ...................... 474/11, 12, 17, 18, 474/28, 69, 70; 74/866-869

[56] References Cited

U.S. PATENT DOCUMENTS 3,893,344  7/1975  Dantlgraber et al. ............ 474/12 X
4,475,416  10/1984  Underwood ...................... 474/28 X

FOREIGN PATENT DOCUMENTS 2828347  10/1982  Fed. Rep. of Germany .
3538884   5/1989  Fed. Rep. of Germany .

Primary Examiner—Thuy M. Bui
Attorney, Agent, or Firm—Peter K. Kontler

[57] ABSTRACT

A continuously variable speed transmission with parallel rotary input and output shaft which respectively carry first and second adjustable sheaves for an endless belt or chain. Each sheave has a first flange which is affixed to the respective shaft and a second flange which is movable axially of the respective shaft toward and away from the adjacent first sheave. A first cylinder and piston unit can receive hydraulic fluid from a first pump to urge the second flange of the first sheave against the adjacent portion of the belt or chain, and the same pump supplies fluid to a second cylinder and piston unit which urges the second flange of the second sheave against the adjacent portion of the belt or chain. A second pump serves to supply hydraulic fluid to a third cylinder and piston unit which is located radially inwardly of the first unit and is operable to change the transmission ratio. The second pump also serves to supply fluid to a torque sensor between a prime mover and the input shaft and, in accordance with one presently preferred embodiment, to a fourth cylinder and piston unit which is located radially inwardly of the second unit and is operable to change the transmission ratio. The fourth unit can be replaced with a diaphragm spring which is installed in the cylinder chamber of the second unit.

17 Claims, 2 Drawing Sheets

CONTINUOUSLY VARIABLE SPEED TRANSMISSION

BACKGROUND OF THE INVENTION

The present invention relates to improvements in continuously variable belt or chain transmissions of the type wherein a first sheave is mounted on a rotary input member, a second sheave is mounted on a rotary output member, each sheave comprises a conical first flange which is affixed to the respective member and a conical second flange which is movable axially of the respective member toward and away from the corresponding first flange, and an endless flexible element (e.g., a chain or a belt) which is trained over the sheaves between the respective first and second flanges.

Transmissions of the above outlined character are disclosed, for example, in German Pat. No. 28 28 347 and in published German patent application No. 35 38 884. These transmissions further comprise means for urging the axially movable flanges against the adjacent portions of the flexible element in response to signals from a torque sensor, and fluid-operated means for changing the transmission ratio by moving the flexible element radially of the input and output members. The torque sensor is installed between a prime mover (which rotates the input member) and the first sheave, and such sensor comprises a valve which is regulated in dependency on variations of transmitted torque. The valve receives fluid from a pump and is designed to at least partially interrupt the flow of fluid therethrough when the transmitted torque develops a peak. Closing or partial closing of the valve in response to an abrupt rise of transmitted torque entails a rise of pressure in the chambers of cylinder and piston units which are used to move the second flanges relative to the associated first flanges so that the axially movable flanges are caused to exert a greater pressure against the adjacent portions of the flexible element. The torque sensor further comprises means for adjusting the valve, and such adjusting means comprises two discs which are provided with confronting cam faces in contact with rolling elements between the two discs. The discs bias their cam faces against the rolling elements with a force which depends upon the pressure of fluid in the valve and upon the pressure of fluid at the outlet of the pump. When the transmitted torque develops a peak at the input side, the distance between the two discs increases and one of these discs thereby seals or partially seals an outlet port so that the rate of outflow of pressurized fluid from the pump by way of the outlet port is reduced as a function of the rise of transmitted torque. The discs further serve as a mechanical torque transmitting means and as a means for reducing the rate of fluid flow through the valve in dependency on an increase of transmitted torque to thus select the force with which the axially movable flanges engage the adjacent portions of the flexible element. As a rule, the valve is at least partially open (except when the abrupt rise of transmitted torque reaches a predetermined maximum value); therefore, the pump must supply pressurized fluid at a rate which suffices to ensure satisfactory transmission of torque by way of the aforediscussed discs as well as to continuously compensate for losses due to flow of pressurized fluid through the valve. In other words, the rate at which pressurized fluid leaks is rather pronounced.

The just discussed pump further serves to select the transmission ratio. To this end, pressurized fluid which leaves the pump is caused to flow through a slide valve to establish a pressure differential in the chambers of cylinder and piston units which serve to shift the axially movable second flanges relative to the first flanges of the respective sheaves, i.e., to change the radial position of the flexible element relative to the input and output members of the transmission. This necessitates the admission of pressurized fluid into the chamber of the cylinder and piston unit for one of the axially movable flanges and simultaneous evacuation of a corresponding quantity of pressurized fluid from the chamber of the cylinder and piston unit for the other axially movable flange. In order to be capable of carrying out all of the above functions, the pump must be designed to raise the pressure of fluid to a rather high value (the pressure which is indicative of the magnitude of transmitted torque can be a multiple of the pressure which is needed to change the transmission ratio). In addition, the pump should be capable of conveying large quantities of fluid per unit of time; this is desirable and necessary in order to ensure that the transmission ratio can be changed within a short interval of time while the fluid is maintained at an elevated pressure. This, in turn, entails pronounced and uninterrupted losses of fluid which are proportional to the rate of fluid flow at an elevated pressure.

OBJECTS OF THE INVENTION

An object of the invention is to provide a continuously variable chain or belt transmission wherein hydraulic fluid losses are a fraction of those in the aforedescribed and other conventional transmissions.

Another object of the invention is to provide a simple, compact and inexpensive continuously variable speed transmission which can be used in motor vehicles and for other purposes as a superior substitute for heretofore known transmissions.

A further object of the invention is to provide the transmission with novel and improved means for changing the positions of axially movable flanges forming part of sheaves on the input and output members of the transmission.

An additional object of the invention is to provide a novel and improved friction clutch which can be utilized in the above outlined continuously variable belt transmission.

Still another object of the invention is to provide the transmission with novel and improved means biasing the axially movable flange on the sheave of the input member.

An additional object of the invention is to provide the transmission with novel and improved means for displacing the axially movable flange of the sheave on the input member.

SUMMARY OF THE INVENTION

The improved continuously variable speed transmission comprises rotary input and output members (e.g., two parallel shafts), and first and second sheaves which are respectively provided on the input and output members. Each sheave comprises a first conical flange which is affixed to and a second conical flange which is movable axially of the respective member. The transmission further comprises an endless flexible element (e.g., a chain or a belt) which is trained over the two sheaves, a first fluid-operated circuit having means for transmitting torque to one of the members, a second fluid-operated circuit having first and second means for moving the second flanges of the first and second sheaves, respectively, a first pump having means for supplying fluid to the first circuit, a second pump having means for supplying fluid to the second circuit, and additional means for moving at least one of the second flanges toward the respective first flange in response to a rise of pressure of fluid which is supplied by the second pump. The transmission further comprises a torque sensor which is provided in one of the two circuits. At least one of the moving means can comprise a hydraulic cylinder and piston unit, and the additional moving means preferably operates in parallel with the respective one of the first and second moving means.

The additional moving means can comprise first additional moving means in parallel with the first moving means and second additional moving means in parallel with the second moving means.

The additional moving means can comprise a portion which is rigid with a portion of one of the first and second moving means.

The arrangement may be such that the additional moving means is disposed at a first distance and one of the first and second moving means is disposed at a second distance from the axis of one of the input and output members. One of the moving means can at least partially surround another of the moving means, and the second distance preferably exceeds the first distance.

At least one of the first and second moving means (preferably the second moving means) can comprise at least one diaphragm spring. The at least one diaphragm spring can bear against the second flange of the second sheave. This spring can have a degressive characteristic curve and can be designed and installed in such a way that it biases the second flange of the second sheave with a greater force when the flexible element is nearer to and with a lesser force when the flexible element is more distant from the axis of the input member. The second moving means can include a hydraulic cylinder and piston unit having a cylinder chamber which accommodates the at least one diaphragm spring.

The transmission can further comprise a friction clutch having a first element (e.g., a flywheel or a first pressure plate) which is connected with one of the input and output members (e.g., with the output member), a second element (e.g., an axially movable pressure plate) which is coaxial with and is non-rotatably coupled to the first element, and a driven element (e.g., a clutch plate) which is interposed between the first and second elements. One of the first and second elements is movable axially to urge the driven element against the other of the first and second elements, and the friction clutch or the transmission can further comprise means for conveying a coolant (e.g., a lubricant) to the driven element of the friction clutch. Such conveying means can comprise a hydraulic pump having a housing portion and a rotor portion which latter is rotatable relative to the housing portion. One of these portions is connected with the driven element and the other of these portions is connected with one of the first and second elements of the clutch. Still further, the friction clutch or the transmission can comprise means (e.g., a stationary conduit) for supplying coolant to the housing portion of the pump. In accordance with a presently preferred embodiment, the housing portion is connected with one of the first and second elements.

The novel features which are considered as characteristic of the invention are set forth in particular in the appended claims. The improved transmission itself, however, both as to its construction and its mode of operation, together with additional features and advantages thereof, will be best understood upon perusal of the following detailed description of certain presently preferred specific embodiments with reference to the accompanying drawing.

DESCRIPTION OF PREFERRED EMBODIMENTS

Figure 1:
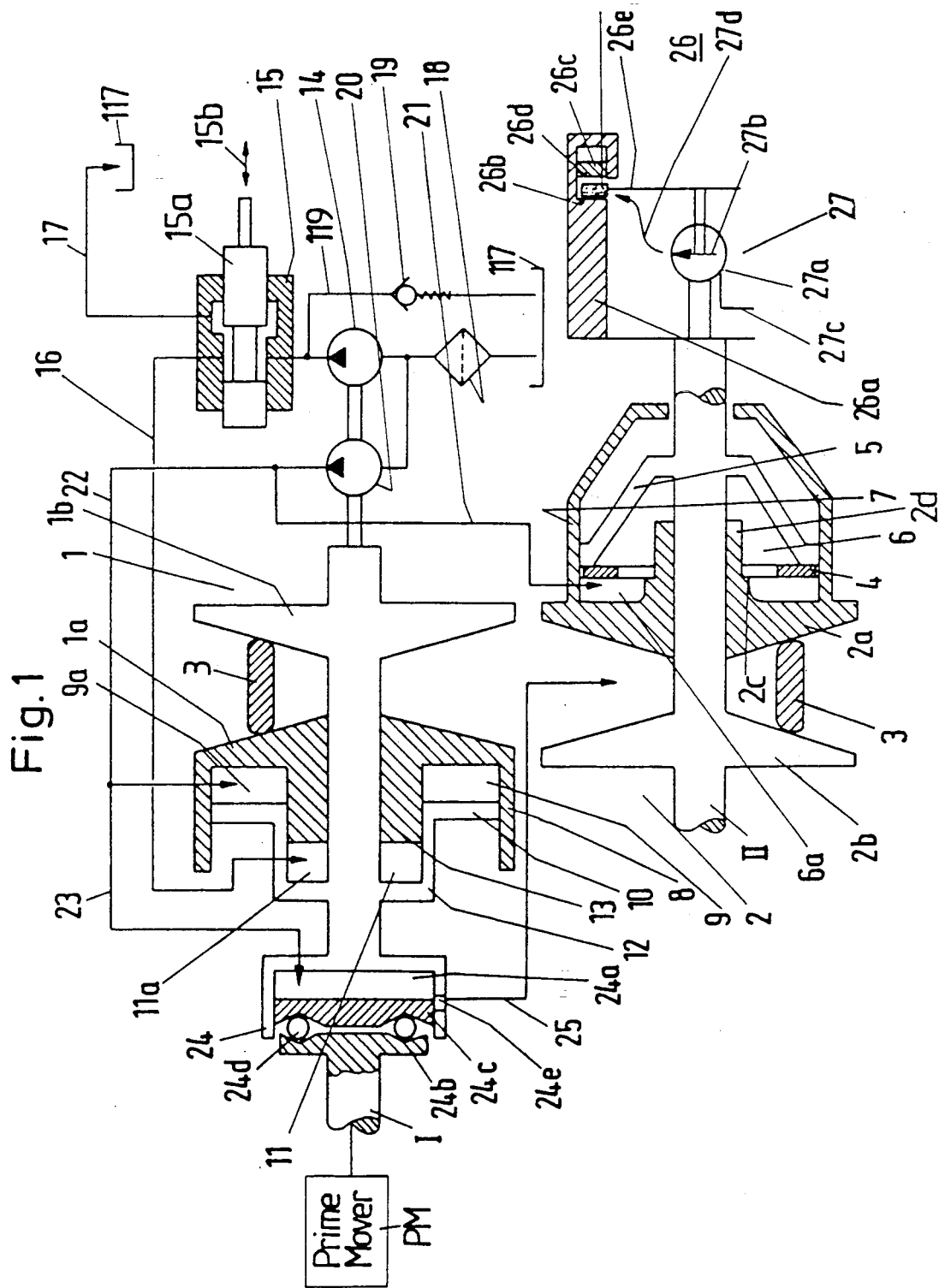
FIG. 1 is a fragmentary schematic partly elevational and partly axial sectional view of a continuously variable speed transmission which embodies one form of the invention and wherein the second moving means comprises a diaphragm spring in the cylinder chamber of a hydraulic cylinder and piston unit of the second moving means.

The continuously variable speed transmission which is shown in FIG. 1 comprises a rotary input member I (e.g., a shaft), a rotary output member II (e.g., a shaft which is parallel with the input member I), a first sheave 1 on the input member I, a second sheave on the output member II, and an endless flexible element 3 (e.g., a chain or a belt) which is trained over the sheaves 1 and 2. The sheave 1 comprises a first conical flange 1b which is rigid (e.g., integral) with the input member I and a second conical flange 1a which is axially movably mounted on the input member I (the flange 1a need not be rotatable on the input member). The second sheave 2 comprises a first conical flange 2b which is rigid (e.g., integral) with the output member II and an axially movable second conical flange 2a having a hub which surrounds a portion of the output member. The flange 2a need not be rotatable on the output member II. The flexible element 3 transmits torque from the input member I to the output member II, and the ratio of the transmission is determined by the radial position of the flexible element relative to the members I and II.

The means for moving the flange 2a axially of the output member II toward the fixedly mounted flange 2b comprises at least one diaphragm spring. FIG. 1 shows a single diaphragm spring 4 which is installed in the cylinder chamber 6a of the cylinder and piston unit 6 forming another part of the means for moving the flange 2a toward the flange 2b. The unit 6 comprises a cylinder 7 which is integral with the flange 2a and a piston 5 which is integral with the output member II. The force with which the diaphragm spring 4 biases the flange 2a depends on the ratio of the transmission. The illustrated spring 4 has a degressive characteristic curve and is designed to exert upon the flange 2a a greater force when the flexible element 3 is nearer to the axis of the input member I and a lesser force when the upper portion of the flexible element 3 (as seen in FIG. 1) is more distant from the axis of the input member. Thus, the bias of the spring 4 upon the flange 2a is more pronounced when the transmission ratio is low and is less pronounced in response to a change of the transmission ratio in a sense to increase the RPM of the output member II while the RPM of the input member I remains unchanged.

The radially outer portion of the diaphragm spring 4 reacts against the piston 5, i.e., against the output member II, and the radially inner portion of the spring 4 bears against a shoulder 2c on a hub 2d of the flange 2a.

The means for moving the flange 1a of the sheave 1 toward the flange 1b comprises a cylinder and piston unit 9 having a cylinder 8 which is rigid (e.g., integral) with the flange 1a and a ring-shaped piston 10 which is rigid (e.g., integral) with the input member I.

The improved transmission comprises additional means for moving the flange 1a toward the flange 1b of the sheave 1, and such additional moving means comprises a third cylinder and piston unit 11 having a cylinder 12 which is rigid (e.g., integral) with the input member I and a piston 13 which is rigid (e.g., integral) with the flange 1a. It will be seen that the units 9 and 11 are mechanically coupled to and operate in parallelism with each other. The unit 11 is nearer to the axis of the input member I than the unit 9; in fact, the unit 9 at least partially surrounds the unit 11. It will further be noted that at least a portion (8 and/or 10) of the unit 9 is integral with a portion (13 and/or 12) of the unit 11.

The input member I drives a first pump 14 the output of which is connected with a conduit 16 leading into the cylinder chamber 11a of the cylinder and piston unit 11 and containing a simple slide valve 15. The latter has a reciprocable valving element 15a which is adjustable in directions indicated by a double-headed arrow 15b to thereby change the ratio of the transmission by admitting pressurized fluid into the chamber 11a of the unit 11 so that the flange 1a moves toward the flange 1b and causes the adjacent portion of the flexible element 3 to move radially of and away from the axis of the input member I. This causes the lower portion (as seen in FIG. 1) of the flexible element 3 to move toward the axis of the output member II whereby the flexible element 3 rotates the output member at a higher speed. The rotational speed of the output member II can be reduced by enabling the diaphragm spring 4 to expel fluid from the chamber 11a of the unit 11. The valving element 15a of the slide valve 15 can be moved between the illustrated position in which the pump 14 can deliver pressurized fluid into the cylinder chamber 11a against the opposition of the diaphragm spring 4, and a second position in which the conduit 16 communicates with a conduit 17 discharging into the sump 117.

The pump 14 can draw fluid (e.g., oil) from the sump 117 by way of a filter 18, and the outlet of the pump 14 can discharge fluid into the sump 117 by way of a conduit 119 which contains a relief valve 19. Such flow of pressurized fluid from the outlet of the pump 14 into the sump 117 will take place when the valving element 15a seals the outlet of the pump 14 from the conduits 16 and 17.

The energy requirements of the pump 14 are low because this pump is merely required to generate fluid pressure which is needed to change the ratio of the transmission by delivering fluid into the cylinder chamber 11a by way of the conduit 16 or by enabling the diaphragm spring 4 to expel fluid from the chamber 11a into the sump 117 by way of the conduit 16, valve 15 and conduit 17. Such low energy requirements of the pump 14 contribute to a higher output than is achievable in conventional transmissions. It has been found that, because the cylinder chamber 11a is relatively small, the quantity of fluid which must be delivered by the pump 14 is approximately 25 percent of the quantity of fluid which is required in a conventional transmission. Moreover, the pressure of fluid which is supplied by the pump 14 is relatively low.

The means for generating fluid pressure which is proportional to transmitted torque comprises a pump 20 which is also driven by the input member I and discharges pressurized fluid into a conduit 21 discharging into the cylinder chamber 6a of the unit 6 and into a conduit 22 discharging into the cylinder chamber 9a of the unit 9. The inlet of the pump 20 draws fluid from the sump 117 through the filter 18. The conduit 22 communicates with a further conduit 23 which admits pressurized fluid into the chamber 24a of a torque sensor 24. The sensor 24 is a valve which is regulated in dependency on the magnitude of transmitted torque, namely of torque which is transmitted to the input member I by a prime mover PM (e.g., the engine of a motor vehicle). The valve or sensor 24 further serves as a means for transmitting torque directly to the input member I ahead of the sheave 1.

The exact design of the sensor 24 forms no part of the invention. The sensor which is shown in FIG. 1 comprises two coaxial discs 24b, 24c having confronting cam faces flanking a set of spherical rolling elements 24d. The casing of the sensor 24 has an outlet port 24e which is exposed or overlapped by the adjacent disc 24c to an extent which is a function of the magnitude of transmitted torque whereby the rate at which the fluid can escape from the chamber 24a is also a function of the magnitude of transmitted torque. The escaping fluid (normally oil) is admitted into a conduit 25 which discharges the fluid against the flexible element 3 so that this flexible element is lubricated (together with the adjacent surfaces of the flanges 1a, 1b and 2a, 2b) whenever the transmission is in actual use.

The angular position of the disc 24b relative to the disc 24c changes in response to a change of transmitted torque whereby the cam face of the disc 24b causes the rolling elements 24d to change the axial position of the disc 24c in the chamber 24a. This, in turn, changes the rate of flow of fluid from the chamber 24a into the conduit 25. The rate at which pressurized fluid can escape from the chamber 24a of the sensor 24 influences the pressure of fluid in the conduits 21, 22 and hence in the cylinder chambers 6a, 9a of the units 6 and 9. Since the units 9 and 11 operate in parallel, the torque-dependent pressure of fluid (in the chamber 9a) is added to the transmission ratio-dependent pressure of fluid in the chamber 11a.

The quantity of fluid which is conveyed by the pump 20 as a function of transmitted torque should suffice to compensate for leakage (at 24e, 25 and elsewhere) in the hydraulic circuit including the conduits 21, 22, 23 and the torque sensor 24 as well as for eventual pressure-induced expansion or widening of various conduits and other parts (such as adjusting or regulating elements). Thus, except for compensation of leakage, the pump 20 need not generate hydraulic energy for that part of the pressure which is proportional to transmitted torque because any changes in volume of the cylinder chamber 11a which are attributable to a change of the transmission ratio (through the medium of the valving element 15a and unit 11) merely entail a flow of fluid from the cylinder chamber 6a into the cylinder chamber 9a or vice versa. Such back-and-forth flow of fluid takes place through the conduits 21 and 22. The energy requirements of the pump 20 are approximately one-sixth of total energy requirements of the pump in a conventional transmission. Furthermore, the combined energy requirements of pumps 14 and 20 are also considerably lower than those of pumps in heretofore known transmissions.

In accordance with a further feature of the invention, the transmission comprises or is combined with a friction clutch 26 having a first rotary element 26a connected to the output member II, a second rotary element 26c in the form of a pressure plate which is rotatable with and is movable axially of the first element 26a, and a driven element 26e in the form of a clutch plate with friction linings 26f disposed between a friction surface 26b of the first element 26a and a friction surface 26d of the axially movable second element 26c. The pressure plate (second element) 26c is movable toward the driven element 26e so that the friction linings 26f are clamped between the friction surfaces 26b, 26d and the driven element 26e is compelled to rotate with the elements 26a, 26c, i.e., with the output member II.

The output member II drives a pump 27 having a housing 27a which is affixed to the output member and a rotor 27b which is affixed to the driven element 26e of the friction clutch 26. The pump 27 is or can constitute a gear pump. The means for supplying a suitable coolant (e.g., oil) to the housing 27a of the pump 27 comprises a stationary conduit 27c. The rotor 27b of the pump 27 can include or constitute a planetary transmission. A conduit 27d supplies coolant from the housing 27a to the friction surface 26b of the first element 26a and to the friction linings 26f of the driven element 26e.

An advantage of the pump 27 is that it delivers coolant only when the friction clutch 26 generates heat as a result of rotation of the first and second elements 26a, 26c relative to the driven element 26e. Thus, the pump 27 delivers coolant via conduit 27d only when the rotor 27b and the housing 27a are caused to turn relative to each other. However, when the clutch 26 is engaged, i.e., when the driven element 26e rotates at the speed of the first and second elements 26a and 26c, the output of the pump 27 is zero because it is not necessary to cool the elements 26a, 26c and/or 26e. This brings about savings in coolant while ensuring highly satisfactory cooling of the clutch elements when such cooling is desirable and necessary. Moreover, losses due to leakage of fluid are reduced to a minimum.

Figure 2:
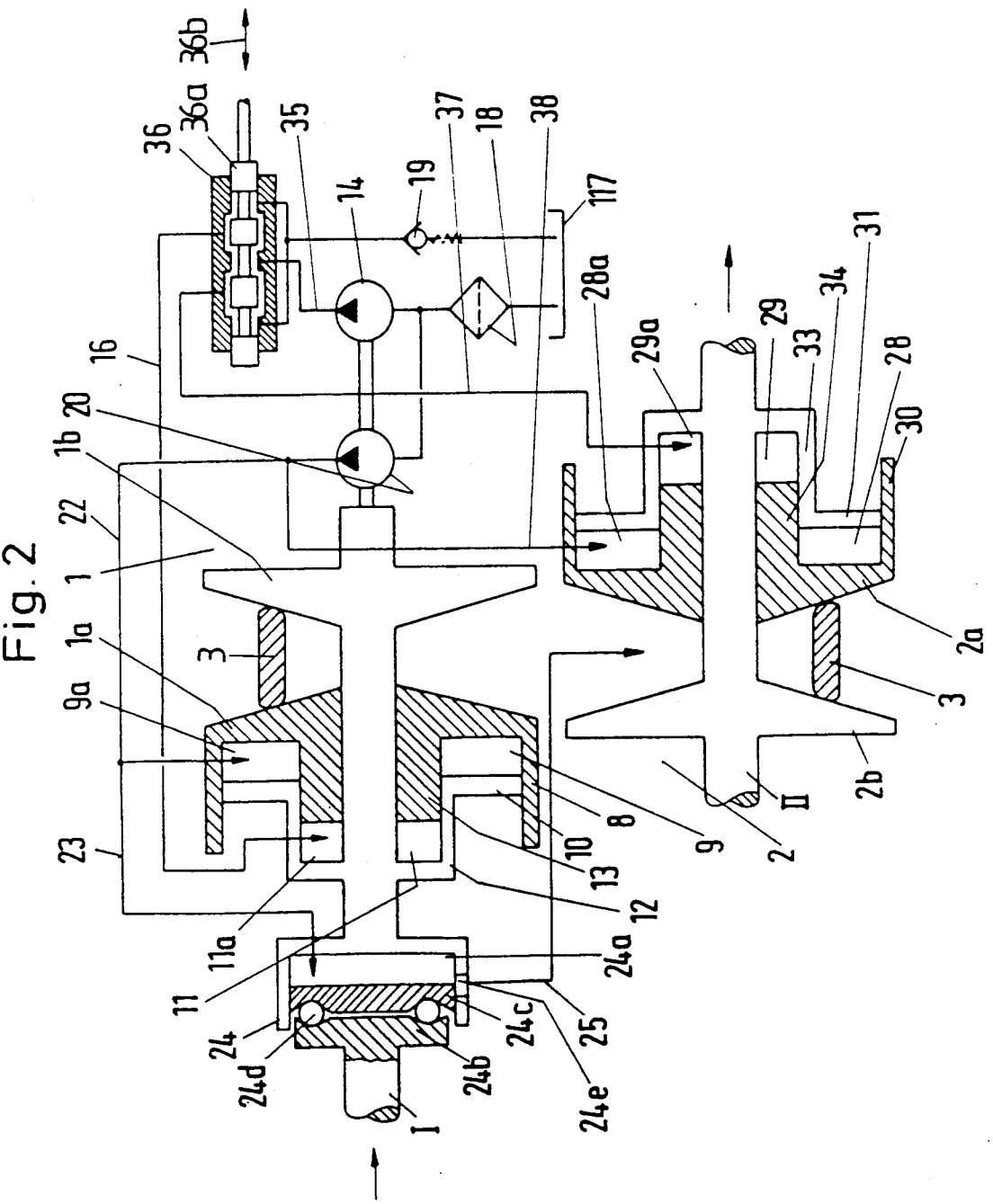
FIG. 2 is a similar fragmentary schematic partly elevational and partly axial sectional view of a modified continuously variable speed transmission wherein the diaphragm spring is replaced with a cylinder and piston unit.

FIG. 2 shows a portion of a second transmission. All such parts of the second transmission which are identical with or clearly analogous to corresponding parts of the transmission of FIG. 1 are denoted by similar reference characters. The manner in which the axially movable conical flange 1a of the sheave 1 on the rotary input member I can be acted upon by pressurized fluid in the cylinder chambers 9a and 11a of the cylinder and piston units 9 and 11 is the same as described in connection with FIG. 1. The torque sensor 24 of FIG. 2 is or can be identical with the similarly referenced torque sensor of the transmission which is shown in FIG. 1.

The cylinder and piston unit 6 of FIG. 1 is replaced with a cylinder and piston unit 28 which is located radially outwardly of an means) 29 for the axially movable flange 2a of the sheave 2 on the output member II.

The pump 14 supplies pressurized fluid to the hydraulic circuit which includes the cylinder and piston units 11, 29 and conduits 16, 37. The latter serves to convey pressurized fluid from the outlet of the pump 14, through a different slide valve 36 and into the cylinder chamber 29a of the unit 29 which can be said to replace the diaphragm spring 4 of FIG. 1. The unit 28 comprises a cylinder 30 which is rigid (e.g., integral) with the axially movable flange 2a, and a piston 31 which is rigid (e.g., integral) with the output member II. The unit 29 comprises a cylinder 33 which is rigid (e.g., integral) with the output member II, and a piston 34 which is rigid (e.g., integral) with the flange 2a of the sheave 2. It will be seen that the unit 28 comprises first and second portions (30, 31) which are respectively integral with the portions 34, 33 of the unit 29. The unit 29 is disposed radially inwardly of the unit 28; in fact, the unit 28 surrounds at least a portion of the unit 29. It can be said that the cylinder 33 of the unit 29 is mechanically coupled to and operates in parallel with the piston 31 of the unit 28.

The pump 14 of FIG. 2 is connected with an inlet of the housing of the slide valve 36 by a conduit 35. A first outlet port of the valve 36 supplies pressurized fluid to the cylinder chamber 11a of the unit 11, and a second outlet port of the valve 36 delivers pressurized fluid to the conduit 37 for admission into the cylinder chamber 29a of the unit 29. The valving element 36a of the valve 36 is adjustable (note the double-headed arrow 36b) in order to select the desired transmission ratio. The arrangement is such that, if the cylinder chamber 29a receives fluid via conduit 37, the conduit 16 evacuates fluid from the cylinder chamber 11a, and vice versa. The pressure of fluid which is supplied by the pump 14 need not be high, and the quantity of conveyed fluid is small because the cylinder chambers 11a and 29a are relatively small (they are adjacent the input member I and output member II, respectively). As a rule, the pressure of fluid which is used to change the transmission ratio is lower than the fluid pressure which is indicative of the magnitude of transmitted torque, i.e., the pressure with which the flanges 1a and 2a are caused to bear against the adjacent portions of the flexible element 3. All in all, the energy requirements of the pump 14 are low and the quantity of fluid which is conveyed by this pump is relatively small.

The output of the pump 20 for the hydraulic circuit including the moving means or cylinder and piston units 9 and 28 delivers pressurized fluid to the conduit 22 for admission into the cylinder chamber 9a, to the conduit 23 for admission into the chamber 24a of the torque sensor 24, and to a conduit 38 for admission into the cylinder chamber 28a of the unit 28. The quantity of fluid which is conveyed by the pump 20 is relatively small; such quantity should suffice to compensate for outflow of fluid through the port 24e of the sensor 24 and for other losses due to leakage and/or enlargement of conduits as a result of rising pressure of the fluid. Such pressure denotes the magnitude of transmitted torque. When the valving element 36a is caused to change its position in order to admit fluid into the chamber 11a or 29a, some fluid will flow from the chamber 9a via conduits 22, 38 into the chamber 28a or in the opposite direction. Thus, and as already described in connection with the pump 20 of FIG. 1, the pump 20 of FIG. 2 must merely compensate for losses at 24e, for losses due to other leakage, and for losses due to enlargement or expansion of certain conduits and/or other parts. However, this pump need not generate any hydraulic energy for that part of fluid pressure which is indicative of the magnitude of transmitted torque.

An important advantage of the improved transmission is that the sum of outputs of the pumps 14, 20 (and hence the total loss) is less than in heretofore known transmissions, even though the sum of forces acting upon the flexible element 3 is the same as in a conventional transmission (all other circumstances being assumed to be the same). This is due to the fact that the improved transmission comprises two discrete pumps, one for the torque-dependent circuit and the other for the circuit which controls the transmission ratio, and that the cylinder and piston units 9, 11 of FIG. 1 as well as the cylinder and piston units 9, 11 and 28, 29 of FIG. 2 are combined in a manner to ensure an addition of the forces. This renders it possible to employ smaller-diameter conduits as well as that the transmission can operate with a smaller cooling system or can operate without any cooling means.

The transmission of FIG. 2 exhibits the advantage that certain portions of the cylinder and piston units 9, 11 as well as portions of the cylinder and piston units 28, 29 are rigid or integral with each other and that such units preferably operate in parallel with one another. Thus, the cylinder 8 is integral with the piston 13, the cylinder 12 is integral with the piston 10, the cylinder 30 is integral with the piston 34, and the cylinder 33 is integral with the piston 31.

An advantage of placing the cylinder and piston unit 11 radially inwardly of the unit 9 and of placing the unit 29 radially inwardly of the unit 28 is that this renders it possible to make the cylinder 8 of the radially outer unit 9 integral with the axially movable flange 1a of the first sheave, and to make the cylinder 30 of the radially outer unit 28 integral with the axially movable flange 2a of the second sheave 2. Thus, the flange 1a of the first sheave 1 in each of the two illustrated embodiments, and the flange 2a of the sheave 2 in the embodiment of FIG. 2, can constitute an axially movable hollow cylinder. Moreover, the piston 10 of the radially outer unit 9 and the piston 31 of the radially outer unit 28 can constitute an annulus, and each of these annuli can be rigid with the respective (input or output) member. Still further, the piston 10 can be rigid with the cylinder 12 of the radially inner unit 11, and the piston 31 can be integral with the cylinder 33 of the radially inner unit 29. The pistons 13 and 34 of the respective radially inner units 11, 29 are rigid or integral with the corresponding axially movable flanges 1a and 2a.

If the valve 36 of FIG. 2 admits pressurized fluid into the cylinder chamber 29a, the conduit 16 conveys fluid from the chamber 11a through the slide valve 36 and relief valve 19 back into the sump 117. Inversely, when the slide valve 36a admits pressurized fluid into the cylinder chamber 11a, the conduit 37 conveys fluid from the chamber 29a by way of the slide valve 36 and relief valve 19. As mentioned above, the pressure of fluid which is supplied by the pump 14 into the chamber 11a of FIG. 1 or into one of the chambers 11a, 29a in FIG. 2 is relatively low and the quantity of such fluid is small. This ensures that the losses are minimal.

The clutch 26 of FIG. 1 can be used to transmit torque from the output member II to the wheels of a motor vehicle.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A continuously variable speed transmission, comprising rotary input and output members; first and second sheaves respectively provided on said input and output members, each of said sheaves comprising a first flange affixed to and a second flange movable axially of the respective member; an endless flexible element trained over said sheaves; a first fluid-operated circuit having means for transmitting torque to one of said members; a second fluid-operated circuit having first and second means for moving the second flanges of said first and second sheaves, respectively; a first pump having means for supplying fluid to said first circuit; a second pump having means for supplying fluid to said second circuit; and additional means for moving at least one of said second flanges toward the respective first flange in response to a rise of pressure of fluid which is supplied by said second pump.

2. The transmission of claim 1, further comprising a torque sensor in one of said circuits.

3. The transmission of claim 1, wherein at least one of said moving means comprises a hydraulic cylinder and piston unit.

4. The transmission of claim 1, wherein said additional moving means operates in parallel with the respective one of said first and second moving means.

5. The transmission of claim 1, wherein said additional moving means comprises first additional moving means in parallel with said first moving means and second additional moving means in parallel with said second moving means.

6. The transmission of claim 1, wherein said additional moving means includes a portion which is rigid with a portion of one of said first and second moving means.

7. The transmission of claim 1, wherein said additional moving means is disposed at a first distance and one of said first and second moving means is disposed at a second distance from the axis of one of said members.

8. The transmission of claim 7, wherein one of said moving means at least partially surrounds another of said moving means.

9. The transmission of claim 7, wherein said second distance exceeds said first distance.

10. The transmission of claim 1, wherein at least one of said first and second moving means comprises a diaphragm spring.

11. The transmission of claim 10, wherein said at least one of said first and second moving means is said second moving means.

12. The transmission of claim 10, wherein said diaphragm spring bears against the second flange of said second sheave, said spring having a degressive characteristic curve and being arranged to bias the second flange of said second sheave with a greater force when said flexible element is nearer to and with a lesser force when said flexible element is more distant from the axis of said input member.

13. The transmission of claim 10, wherein said second moving means includes a hydraulic cylinder and piston unit having a cylinder chamber and said diaphragm spring is disposed in said chamber.

14. The transmission of claim 1, further comprising a friction clutch including a first element connected with one of said members, a second element coaxial with and non-rotatably coupled to said first element, a driven element between said first and second elements, one of said first and second elements being movable axially to urge said driven element against the other of said first and second elements, and means for conveying a coolant to said driven element.

15. The transmission of claim 14, wherein said conveying means comprises a pump having a housing portion and a rotor portion rotatable relative to said housing portion, one of said portions being connected with said driven element and the other of said portions being connected with one of said first and second elements.

16. The transmission of claim 15, further comprising means for supplying coolant to said housing portion.

17. The transmission of claim 15, wherein said housing portion is connected with one of said first and second elements.

* * * * *